(12) United States Patent
Huang et al.

(10) Patent No.: US 11,320,583 B2
(45) Date of Patent: May 3, 2022

(54) BACKLIGHT MODULE AND DISPLAY DEVICE (71) Applicants: Radiant(Guangzhou) Opto-Electronics Co., Ltd, Guangzhou (CN); RADIANT OPTO-ELECTRONICS CORPORATION, Kaohsiung (TW)

(72) Inventors: Lin-Yu Huang, Kaohsiung (TW); Yi-Shan Lin, Kaohsiung (TW); Ching-Chieh Yeh, Kaohsiung (TW)

(73) Assignees: RADIANT(GUANGZHOU) OPTO-ELECTRONICS CO, LTD, Guangzhou (CN); RADIANT OPTO-ELECTRONICS CORPORATION, Kaohsiung (TW)

( * ) Notice: Subject to any disclaimer, the term of this patent is extended or adjusted under 35 U.S.C. 154(b) by 0 days.

(21) Appl. No.: 16/992,716

(22) Filed: Aug. 13, 2020

(65) Prior Publication Data
US 2021/0124105 A1    Apr. 29, 2021

Related U.S. Application Data (63) Continuation of application No. PCT/CN2019/112769, filed on Oct. 23, 2019.

(51) Int. Cl.
*F21V 8/00* (2006.01)
*G02B 30/33* (2020.01)

(52) U.S. Cl.
CPC .......... *G02B 6/009* (2013.01); *G02B 6/0068* (2013.01); *G02B 6/0088* (2013.01); *G02B 30/33* (2020.01)

(58) Field of Classification Search
CPC .... G02B 6/009; G02B 6/0068; G02B 6/0088; G02B 30/33; G02B 6/0076
(Continued)

(56) References Cited

U.S. PATENT DOCUMENTS

2008/0204631 A1* 8/2008 Takada ................. G02B 6/0068
349/65
2012/0188465 A1  7/2012 Ohyama

FOREIGN PATENT DOCUMENTS

CN    10 1477271 A    7/2009
CN    10 1956936 A    1/2011
(Continued)

*Primary Examiner* — Andrew J Coughlin
*Assistant Examiner* — Jessica M Apenteng
(74) *Attorney, Agent, or Firm* — Bacon & Thomas, PLLC (57) ABSTRACT

A backlight module comprises a frame unit, a plurality of light-emitting units, a first optical unit and a second optical unit. The frame unit includes a metal rear frame. The metal rear frame has a first carrying portion, and a second carrying portion spaced from the first carrying portion. The first carrying portion and the second carrying portion are not at the same height. One of the plurality of light-emitting units is disposed on the first carrying portion, and another one of the plurality of light-emitting units is disposed on the second carrying portion. The first optical unit is configured to receive the light generated from the light-emitting unit disposed on the first carrying portion, and the second optical unit is configured to receive the light generated from the light-emitting unit disposed on the second carrying portion. Through the structure of the metal rear frame, the light-emitting unit can directly contact the metal rear frame and the heat dissipation efficiency can be enhanced. The present invention provides a display device including the backlight module.

20 Claims, 9 Drawing Sheets

(58) Field of Classification Search
USPC .................................................. 362/600–634
See application file for complete search history.

(56) References Cited

FOREIGN PATENT DOCUMENTS

| | | |
|---|---|---|
| CN | 20 5320365 U | 6/2016 |
| CN | 10 6023801 A | 10/2016 |
| JP | 2010 170898 A | 8/2010 |
| TW | 2010 20646 A | 6/2010 |

* cited by examiner

BACKLIGHT MODULE AND DISPLAY DEVICE

RELATED APPLICATIONS

This application is a continuation application of International Application No. PCT/CN2019/112769 filed on Oct. 23, 2019, which is incorporated herein by reference.

BACKGROUND OF THE INVENTION

1. Field of the Invention

The present invention relates to an optical device. More particularly, the present invention relates to a backlight module and a display device.

2. Description of the Prior Art

The flat display panels gradually become the mainstream of display devices. Products using flat display panels include panel display screens, flat TVs for home use, panel-type monitors of personal computer and laptops, display screens for mobile phones and digital camera, etc. The market demand for liquid crystal display devices has grown significantly in recent years. In order to meet the functional and appearance requirements of liquid crystal display devices, the backlight modules used in liquid crystal display devices also becomes diverse.

In order to meet various lighting requirements of the liquid crystal display device, the backlight module requires more than two sets of light sources. However, in the current design of the frame structure, one of the light sources may be directly set on the mold frame. The mold frame is made of insulating materials, and has a poor heat dissipation efficiency. Therefore, the thermal energy will be accumulated and the temperature will become higher when the light sources are turned on.

SUMMARY OF THE INVENTION

One object of the present invention is to provide a backlight module with good heat dissipation efficiency.

The backlight module comprises a frame unit, a plurality of light-emitting units, a first optical unit, and a second optical unit. The frame unit includes a metal rear frame. The metal rear frame has a first carrying portion, and a second carrying portion spaced from the first carrying portion. The first carrying portion and the second carrying portion are not at the same height. One of the plurality of light-emitting units is disposed on the first carrying portion, and another one of the light-emitting unit is disposed on the second carrying portion. The first optical unit is configured to receive the light generated from the light-emitting unit disposed on the first carrying portion. The second optical unit is configured to receive the light generated from the light-emitting unit disposed on the second carrying portion.

Another technique of an embodiment of the present invention is that the metal rear frame is provided with a rectangular body area, a first side edge area connected to one side of the body area, a second side edge area connected to another side of the body area and corresponding to the first side edge area, and two third side edge areas, wherein each of the two third side edge areas is connected to the first side edge area and the second side edge area. The first side edge area and the second side edge area extend upward from the body area and are higher than the body area. The cross section of the first side edge area and the second side edge area are inverted U-shaped. The two third side edge areas extend upward from the body area to form a plurality of sidewalls.

Another technique of an embodiment of the present invention is that the first carrying portion is located in the body area and near the first side edge area, and the second carrying portion is located on the top of the first side edge area.

Another technique of an embodiment of the present invention is that the first carrying portion is located in the body area and near the third side edge area, and the second carrying portion is located on the top of the first side edge area.

Another technique of an embodiment of the present invention is that the metal rear frame is further provided with a third carrying portion disposed on the second side edge area. The third carrying portion is located on the top of the second side edge area and is the same height as the second carrying portion. One of the plurality of light-emitting units is located on the third carrying portion, and the second optical unit further receives the light generated from the light-emitting unit disposed on the third carrying portion.

Another technique of an embodiment of the present invention is that the metal rear frame is further provided with a plurality of holes distributed on the second carrying portion, on the third carrying portion and on the junction of the two third side edge areas and the body.

Another technique of an embodiment of the present invention is that the frame unit further includes a mold frame covering the first side edge area, the second side edge area, and the two third side edge areas of the metal rear frame, and the mold frame is filled in the plurality of holes.

Another technique of an embodiment of the present invention is that the metal rear frame is further provided with at least one outlet located on the first side edge area or the second side edge area, and the plurality of holes near the outlet have higher distribution density than the plurality of holes away the outlet.

Another object of the present invention is to provide a display device comprising an aforementioned backlight module.

The display device comprises an aforementioned backlight module and a display panel disposed on the backlight module.

The advantage of the embodiments of this present invention is that through the structure design of the metal rear frame, the plurality of light-emitting units can directly contact the first carrying portion and the second carrying portion of the metal rear frame, and hence the heat dissipation efficiency can be improved.

DETAILED DESCRIPTION OF THE PREFERRED EMBODIMENTS

Specific structural and functional details disclosed herein will become apparent from the following description of the preferred embodiments of the present invention taken in conjunction with the accompanying drawings, which provides a better understanding to a person having ordinary skill in the art but shall not be construed as limiting the invention. Wherever possible, the same reference numbers are used in the drawings and the description to refer to the same or like parts.

Figure 1:
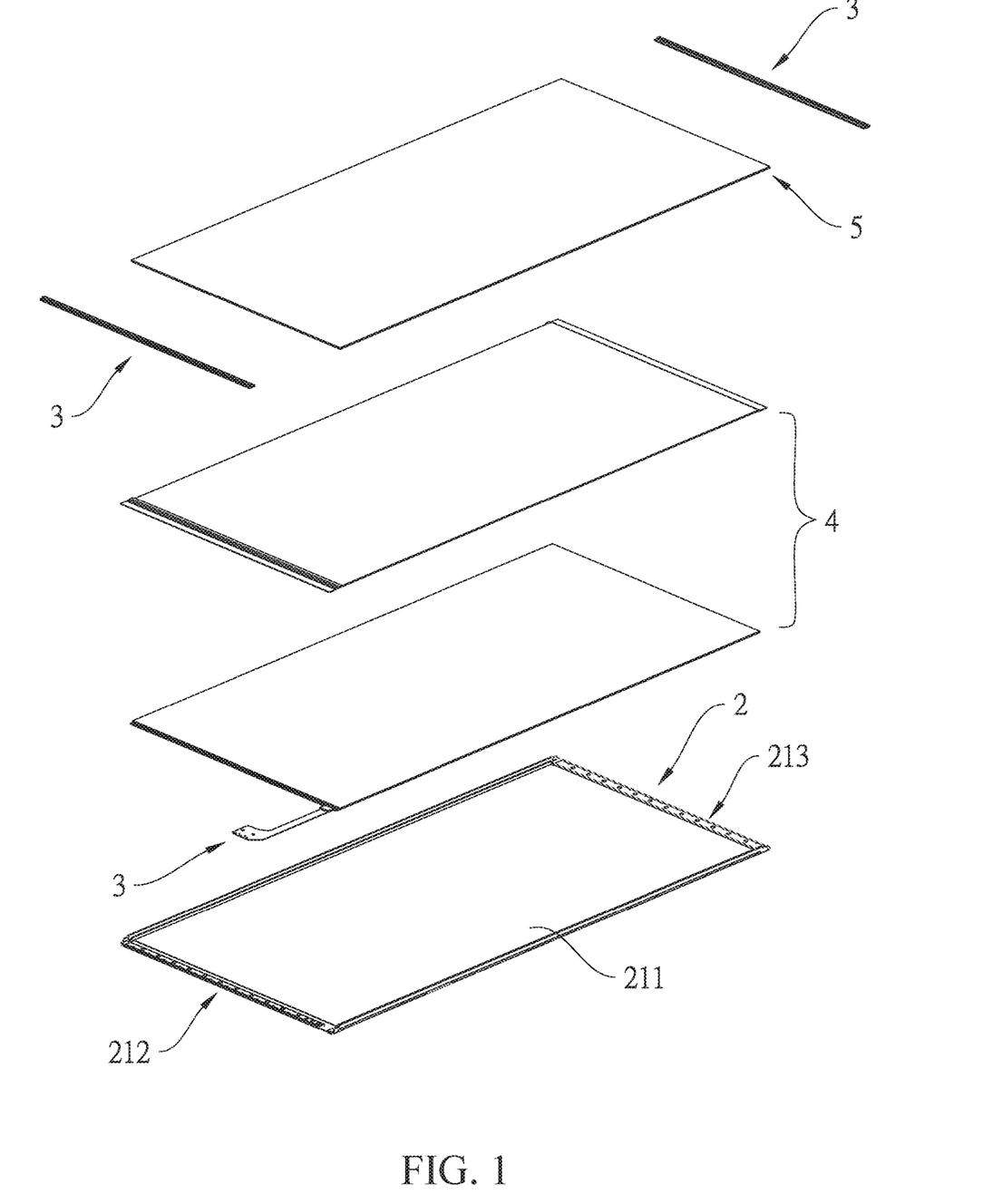
FIG. 1 is a schematic exploded view illustrating a first preferred embodiment of the backlight module of the present invention.

Referring to FIG. 1, a first preferred embodiment of the backlight module of the present invention, comprises a frame unit 2, a plurality of light-emitting units 3, a first optical unit 4, and a second optical unit 5.

Figure 2:
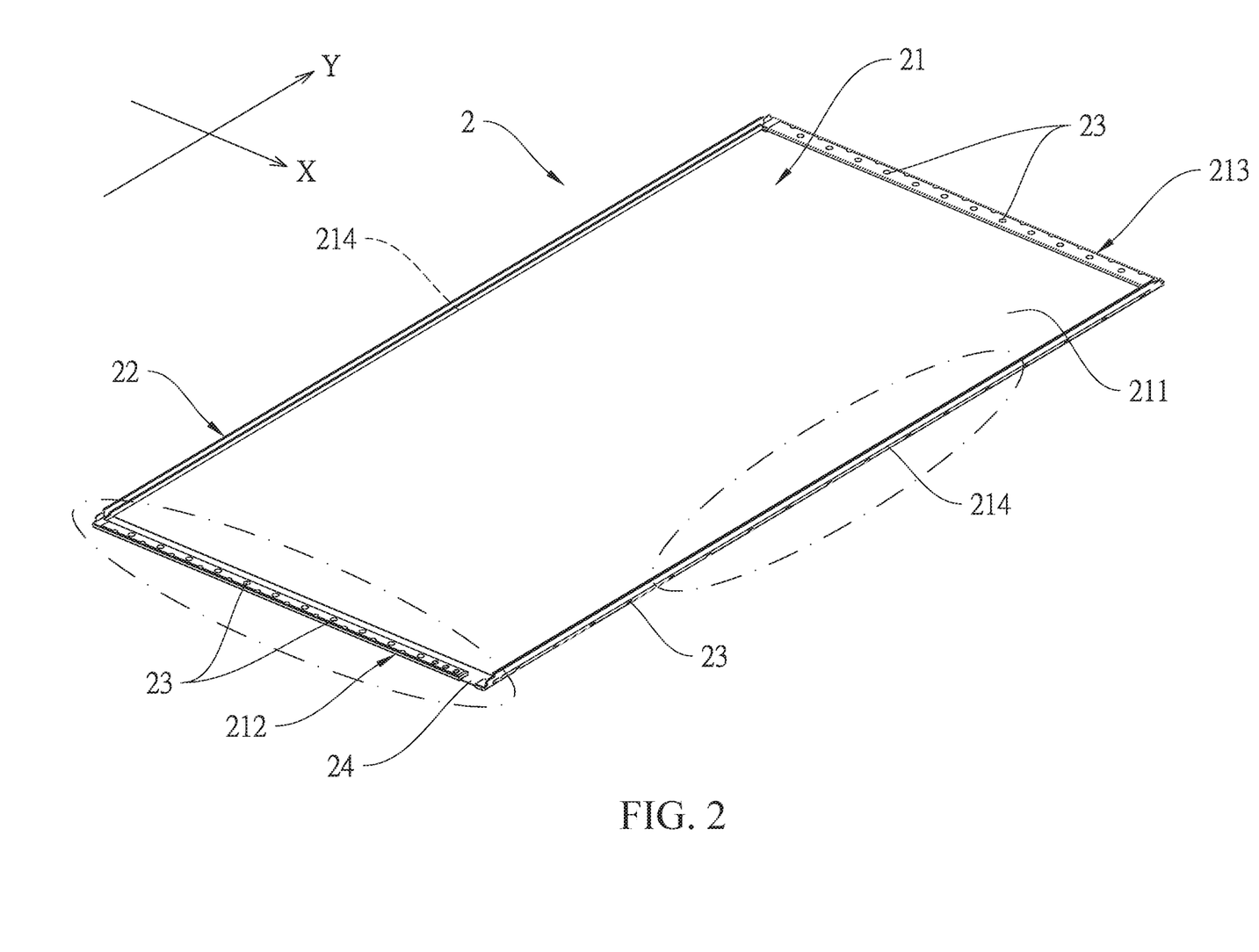
FIG. 2 is a perspective view illustrating the structure of a frame unit according to an embodiment.
Figure 3:
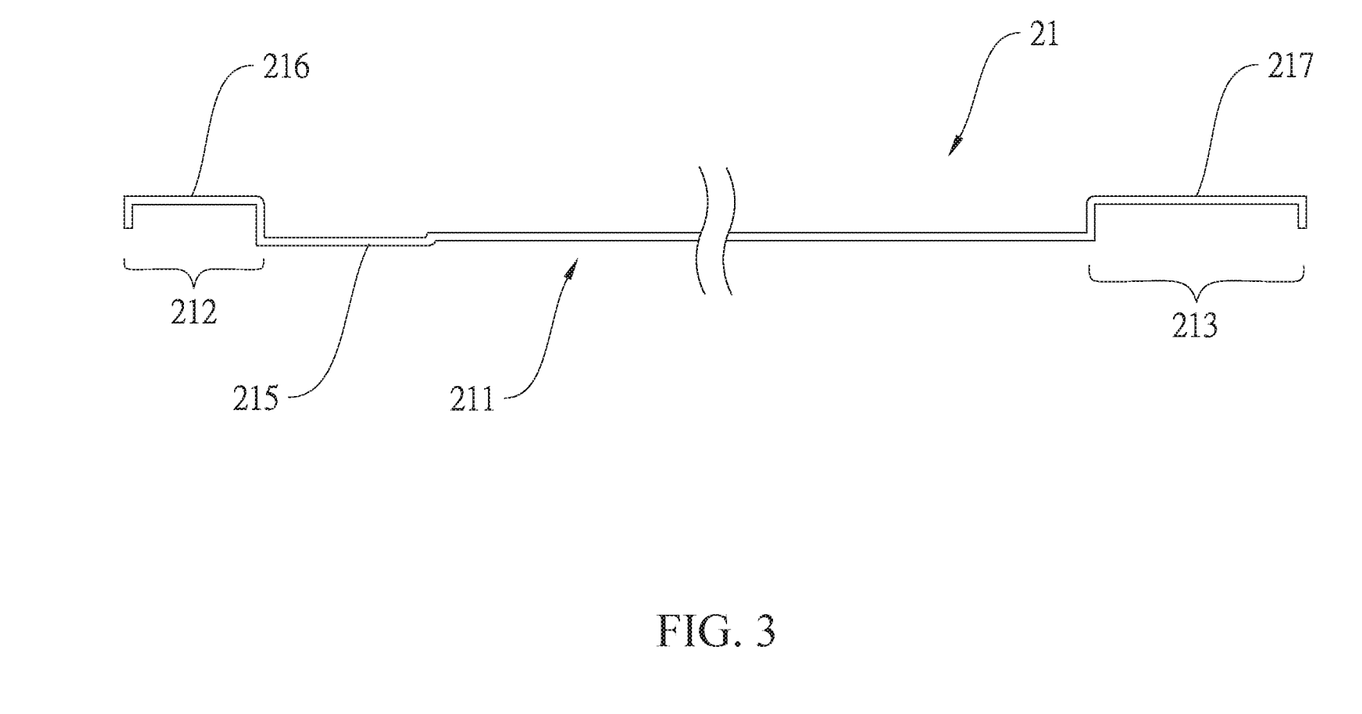
FIG. 3 is a sectional view further elaborating on FIG. 2.

Referring to FIGS. 2 and 3, the frame unit 2 includes a metal rear frame 21, and a mold frame 22 covering the metal rear frame 21. The metal rear frame 21 is provided with a rectangular body area 211, a first side edge area 212 connected to one side of the body area 211, a second side edge area 213 connected to another side of the body area 211 and corresponding to the first side edge area 212, and two third side edge areas 214, wherein each of the two third side edge areas 214 is connected to the first side edge area 212 and the second side edge area 213.

Figure 5:
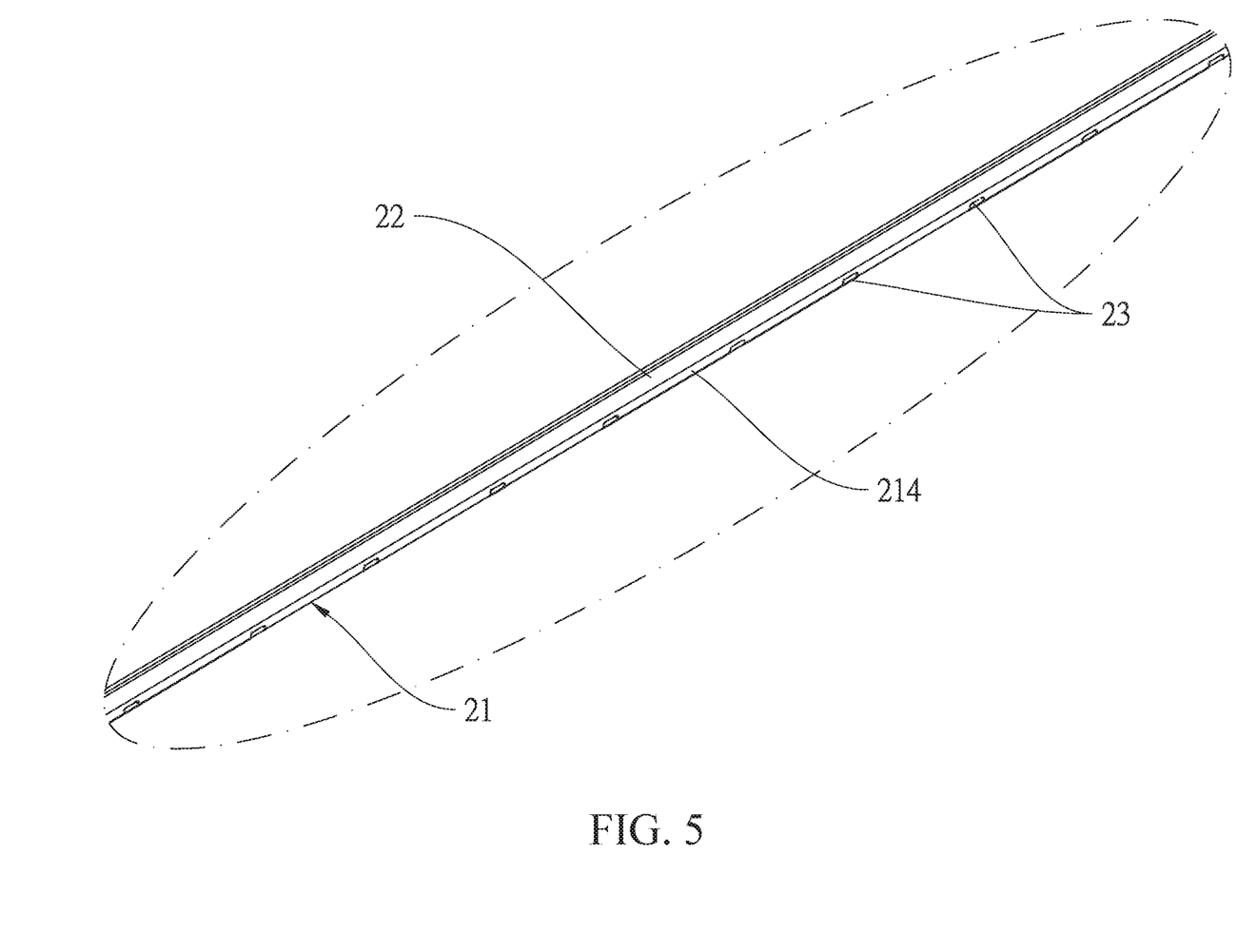

Referring to FIGS. 2 and 3, the first side edge area 212 and the second side edge area 213 of the metal rear frame 21 extend upward from the body area 211 and are higher than the body area 211. The first side edge area 212 and the second side edge area 213 may extend upward and are bent upward from the edge of the body area 211 as shown in FIG. 3. The cross section of the first side edge area 212 and the second side edge area 213 are inverted U-shaped. The two third side edge areas 214 extend upward from the body area 211 to form a plurality of sidewalls. The two third side edge areas 214 may extend upward as shown in FIG. 5, in other words, they are bent from the end edge of the body area 211 and extend upward. The body area 211 has a first carrying portion 215. The first side edge area 212 is provided with a second carrying portion 216, and the second side edge area 213 is provided with a third carrying portion 217. In this embodiment, the first carrying portion 215 is located in the body area 211 and near the first side edge area 212, and the second carrying portion 216 is located on the top of the first side edge area 212. The third carrying portion 217 is located on the top of the second side edge area 213 and is the same height as the second carrying portion 216.

Figure 4:
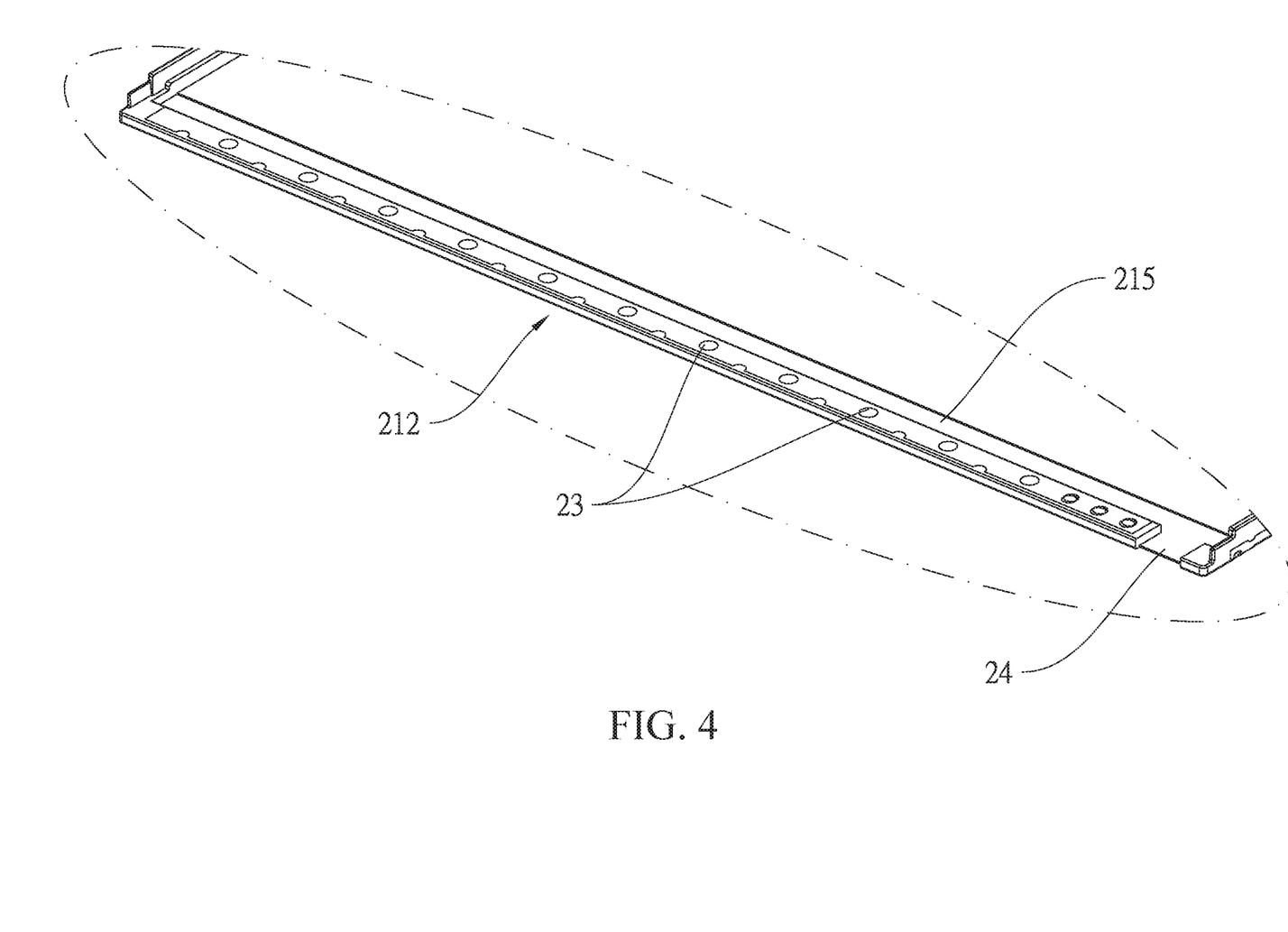
FIGS. 4-5 are partial schematic side views, which are enlarged portions of the area marked in FIG. 2.

Referring to FIGS. 2, 4 and 5, the metal rear frame 21 is further provided with a plurality of holes 23, and an outlet 24. The plurality of holes 23 are distributed on the second carrying portion 216, on the third carrying portion 217 and on the junction of the two third side edge areas 214 and the body 211. The plurality of holes 23 near the outlet 24 have higher distribution density than the plurality of holes 23 away the outlet 24. In this embodiment, the outlet 24 is located on the first side edge area 212. Depending on the actual manufacturing situation, it is allowable to dispose the outlet 24 on the second side edge area 213 or on both of the first side edge area 212 and the second side edge area 213, which shall not be limited in this embodiment of the present invention. The mold frame 22 covers the first side edge area 212, the second side edge area 213, and the two third side edge areas 214 of the metal rear frame 21 by injection molding, and the mold frame 22 is filled in the plurality of holes 23. Therefore, the plurality of holes 23 near the outlet 24 have higher distribution density than the plurality of holes 23 away the outlet 24, so that the bonding force is enhanced between the mold frame 22 and the metal rear frame 21 near the outlet 24 to prevent the mold frame 22 near the outlet 24 from separating with the metal rear frame 21.

Referring to FIGS. 1 and 3, they further explain that the first carrying portion 215, the second carrying portion 216, and the third carrying portion 217 are configured to accommodate the plurality of light-emitting units 3. Therefore, the plurality of light-emitting units 3 can be directly disposed on the metal rear frame 21. In this embodiment, the plurality of light-emitting units 3 are parallel to each other from a top view, but they can be categorized into upper light-emitting units 3 and lower light-emitting units 3 from a sectional view in the thickness direction.

Figure 6:
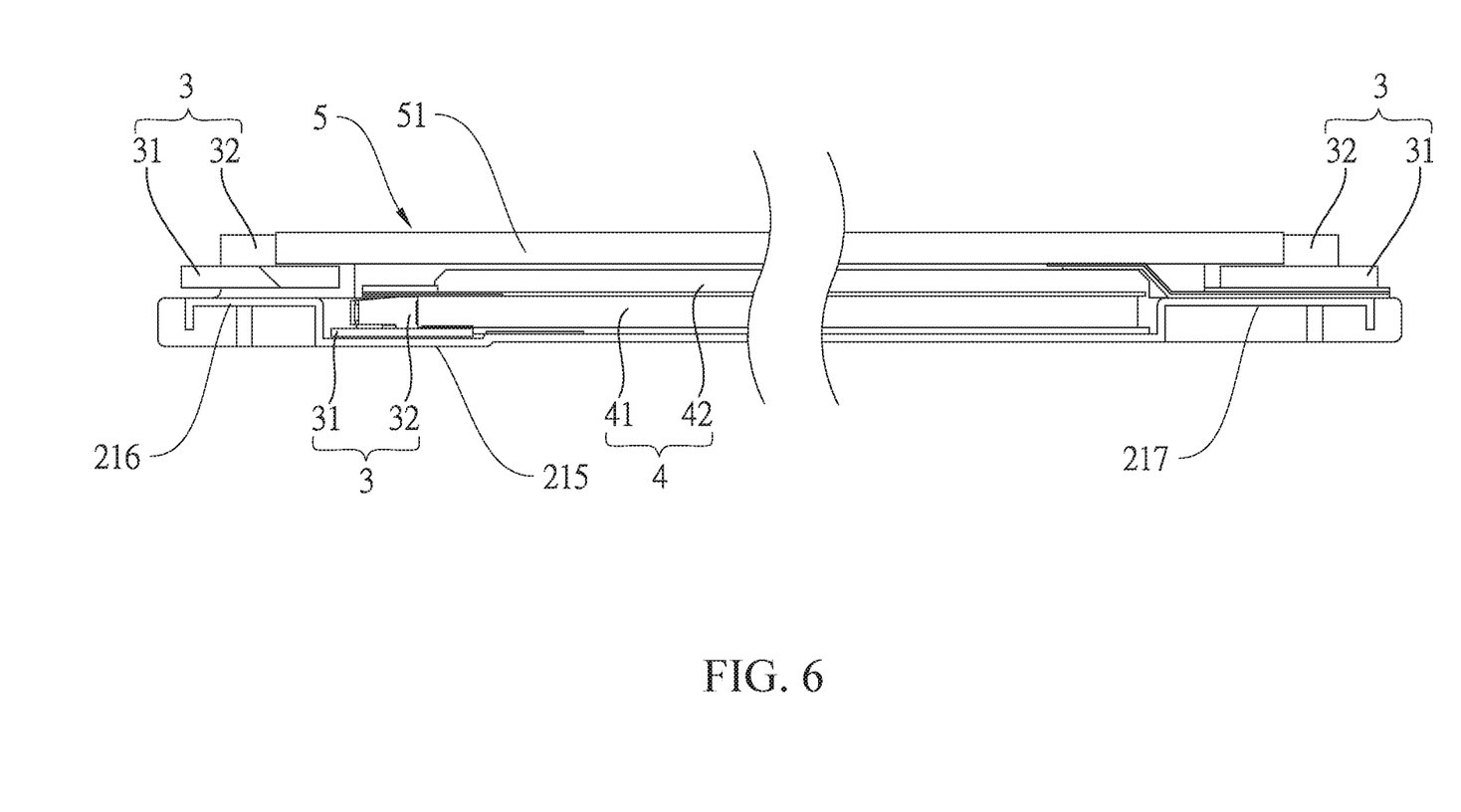
FIG. 6 is a sectional view illustrating the assembly of the first preferred embodiment of the backlight module of the present invention in FIG. 1.

Referring to FIG. 6, each light-emitting unit 3 includes a circuit board 31, and a plurality of light-emitting members 32 electrically connected to the circuit board 31 (only one light-emitting member 32 is shown due to the view angle). The first optical unit 4 is configured to receive the light generated from the light-emitting unit 3 disposed on the first carrying portion 215, and the first optical unit 4 includes a first light guide plate 41 and a first optical film assembly 42 disposed on the first light guide plate 4. The first optical film assembly 42 may include various optical films such as a brightness enhancement film, an upper prism sheet, a lower prism sheet, a diffuser, or a color filter. The selection and quantity of the optical films depend on actual requirements. The second optical unit 5 is located above the first optical unit 4 and set between the second carrying portion 216 and the third carrying portion 217, and the second optical unit 5 includes a second light guide plate 51. The second optical unit 5 is configured to receive the light generated from the light-emitting unit 3 disposed on the second carrying portion 216 and the third carrying portion 217. In this embodiment, the first light guide plate 41 is a 2D light guide plate made of plastic, usually using PMMA. The second light guide plate 51 is a 3D light guide plate made of glass, and has the dot pattern made by semiconductor lithography.

Figure 7:
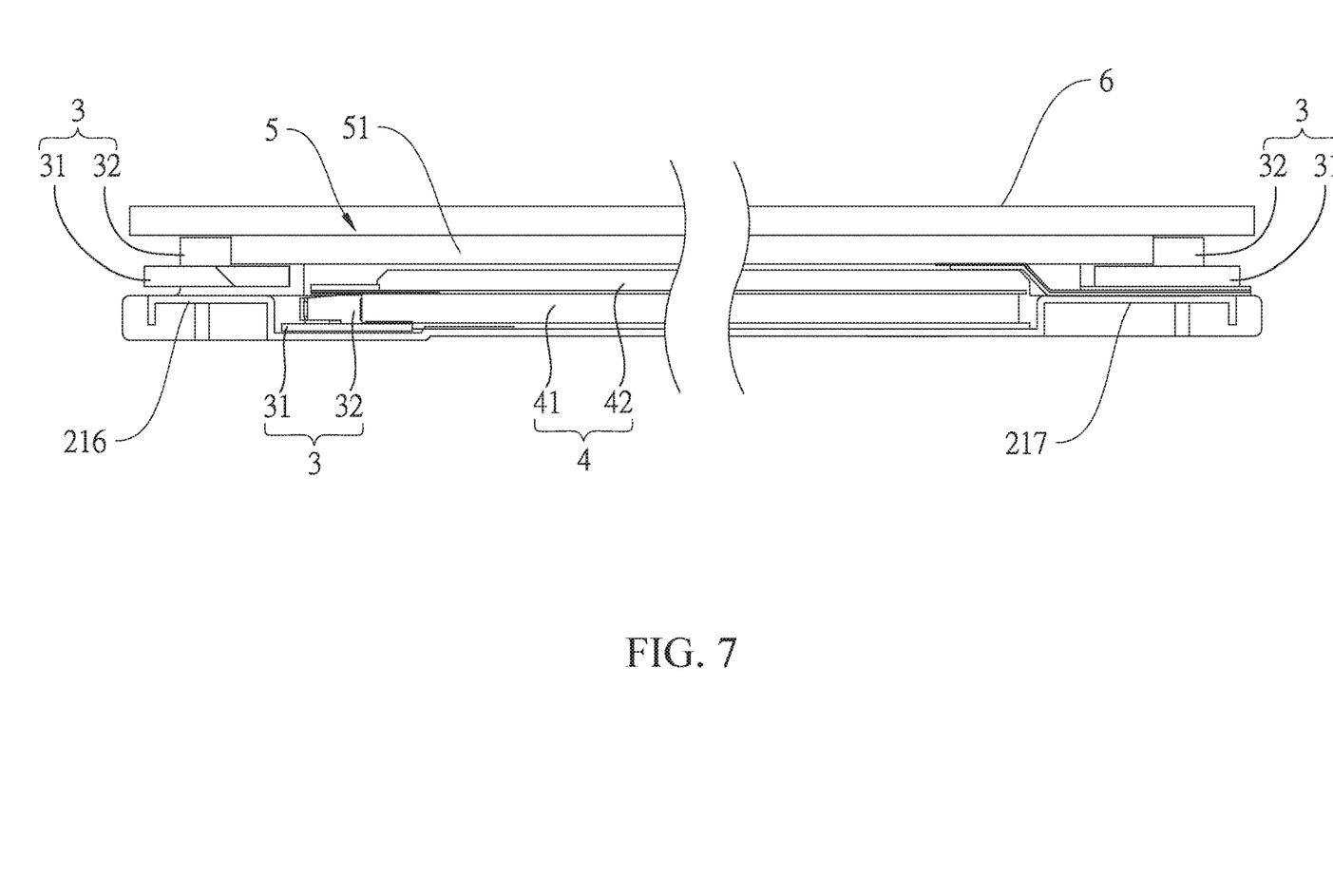
FIG. 7 is a sectional view further elaborating on FIG. 6, which is shown as a display device with a display panel.

Referring to FIG. 7, the backlight module of the present invention is assembled in the manner shown in FIG. 6, which is fitted with a display panel 6 to become a display device. When the backlight module of the present invention is applied to a mobile phone or a screen with 3D display mode, it can be switched between 2D display mode and 3D display mode. When the backlight module is switched to the 2D display mode, the light emitting unit 3 disposed on the first carrying portion 215 can emit light. The light-emitting unit 3 disposed on the second carrying portion 216 and the third carrying portion 217 do not emit light or emit little light. Therefore, since the second light guide plate 51 is made of glass, it will not block the light emitted from the lower level. Hence the surface light converted by the first optical unit 4 will pass through the second light guide plate 51 to the display panel 6, so that the display panel 6 can provide the 2D display mode. On the other hand, when the backlight module is switched to the 3D display mode, only the light emitting unit 3 disposed on the second carrying portion 216 and the third carrying portion 217 can emit light, and the light emitting unit 3 disposed on the first carrying portion 215 does not emit light. In other words, the direction of light can be manipulated by the two light emitting units 3 disposed on the second carrying portion 216 and the third carrying portion 217. When the picture for the left eye is produced, only the light-emitting unit 3 used for the left eye will emit light. At this time, the light will enter the left eye due to the second light guide plate 51. Similarly, when the picture for the right eye is produced, the light unit 3 used for the right eye emits light instead, so that the light only enters the right eye. In this way, a pair of stereo images can be alternately projected to the left or right eye, and provide the high-resolution images which can be viewed with the naked eye.

In the present invention, the metal rear frame 21 has a bending shape, so that the cross section of the first side edge area 212 and the second side edge area 213 can be inverted U-shaped. The following advantages can be obtained by the above structure:

1. Improved heat conduction and heat dissipation efficiency: in the embodiment, three sets of light emitting units 3 are required, so the first carrying portion 215, the second carrying portion 216, and the third carrying portion 217 used to accommodate the light-emitting unit 3 can be formed by the body area 211 of the metal rear frame 21 with the first side edge area 212 and the second side edge area 213. Furthermore, since the light-emitting units 3 directly contact the metal rear frame 21, the heat generated during operation of the light emitting units 3 will be led out and dissipated by the metal rear frame 21, and thermal energy accumulation will be avoided and lower the temperature.

2. Improved positioning: the first side edge area 212 and the second side edge area 213 are bent as an inverted U shape, so that the second carrying portion 216 and the third carrying portion 217 can be formed on the top of the first side edge area 212 and the second side edge area 213. In this way, the first carrying portion 215 of the body area 211 is misaligned with the second carrying portion 216 and the third carrying portion 217 to avoid mutual interference. Thus, it will effectively improve the assembly efficiency of the light emitting units 3 and reduces damage to the light emitting member 32 during the assembly process.

3. Enhanced structure: compared to the total flat metal frame, the metal rear frame 21 of the embodiment has an inverted U shape on its two sides, so that deformation caused by an external force can effectively be reduced. Moreover, the plastic shrinkage of the mold frame 22 can also be reduced, and the overall structure is enhanced to reduce the deformation.

Figure 8:
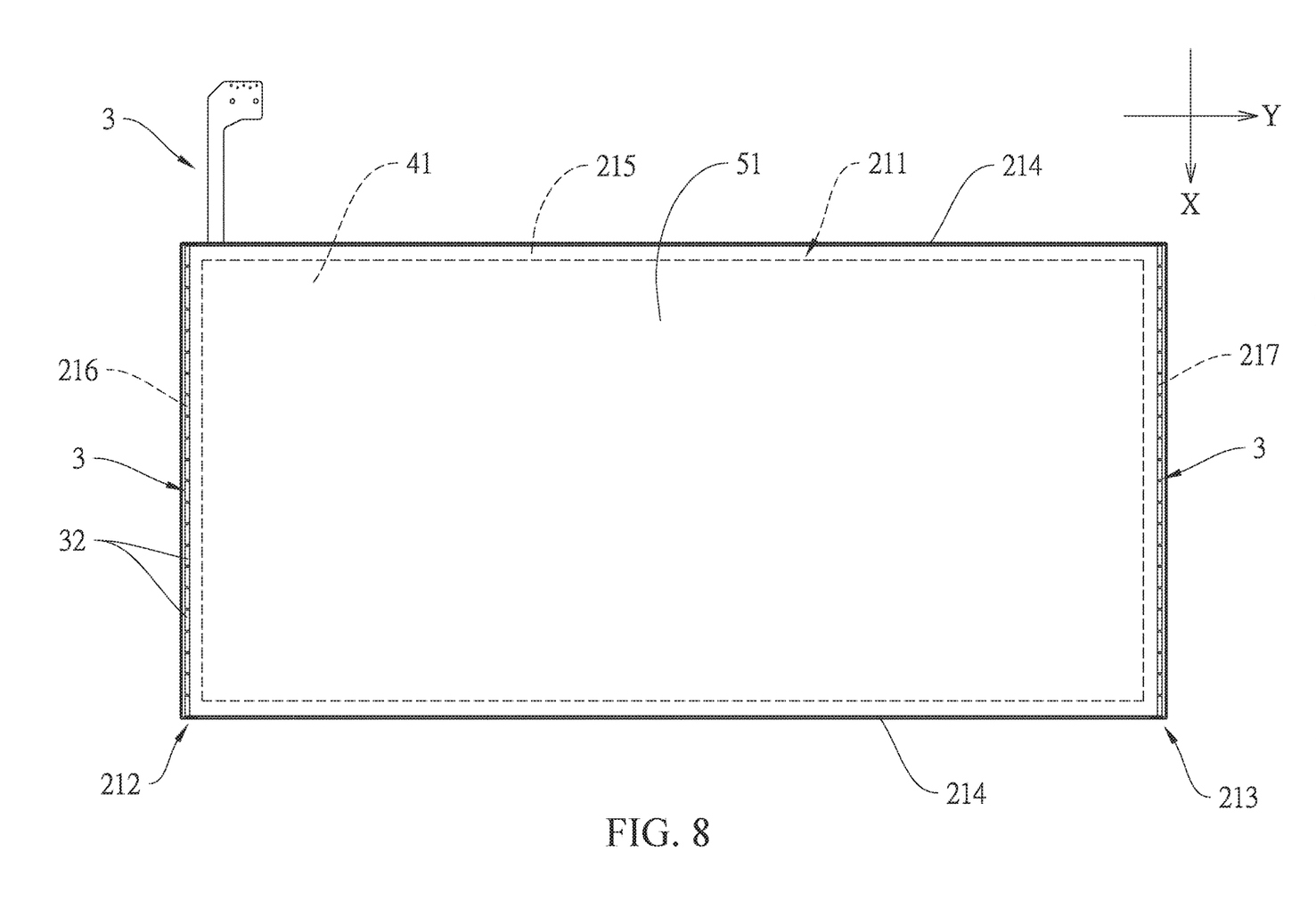
FIG. 8 is a top view illustrating a second preferred embodiment of the backlight module of the present invention.

Referring to FIG. 8, a second preferred embodiment of the backlight module of the present invention is substantially the same as the first preferred embodiment. Their difference is that the first carrying portion 215 is located in the body area 211 near the third side edge area 214, and the second carrying portion 216 is located on the top of the first side edge area 212. It can be understood that in the embodiment, the first carrying portion 215 is perpendicular to the second carrying portion 216 and the third carrying portion 217.

Figure 9:
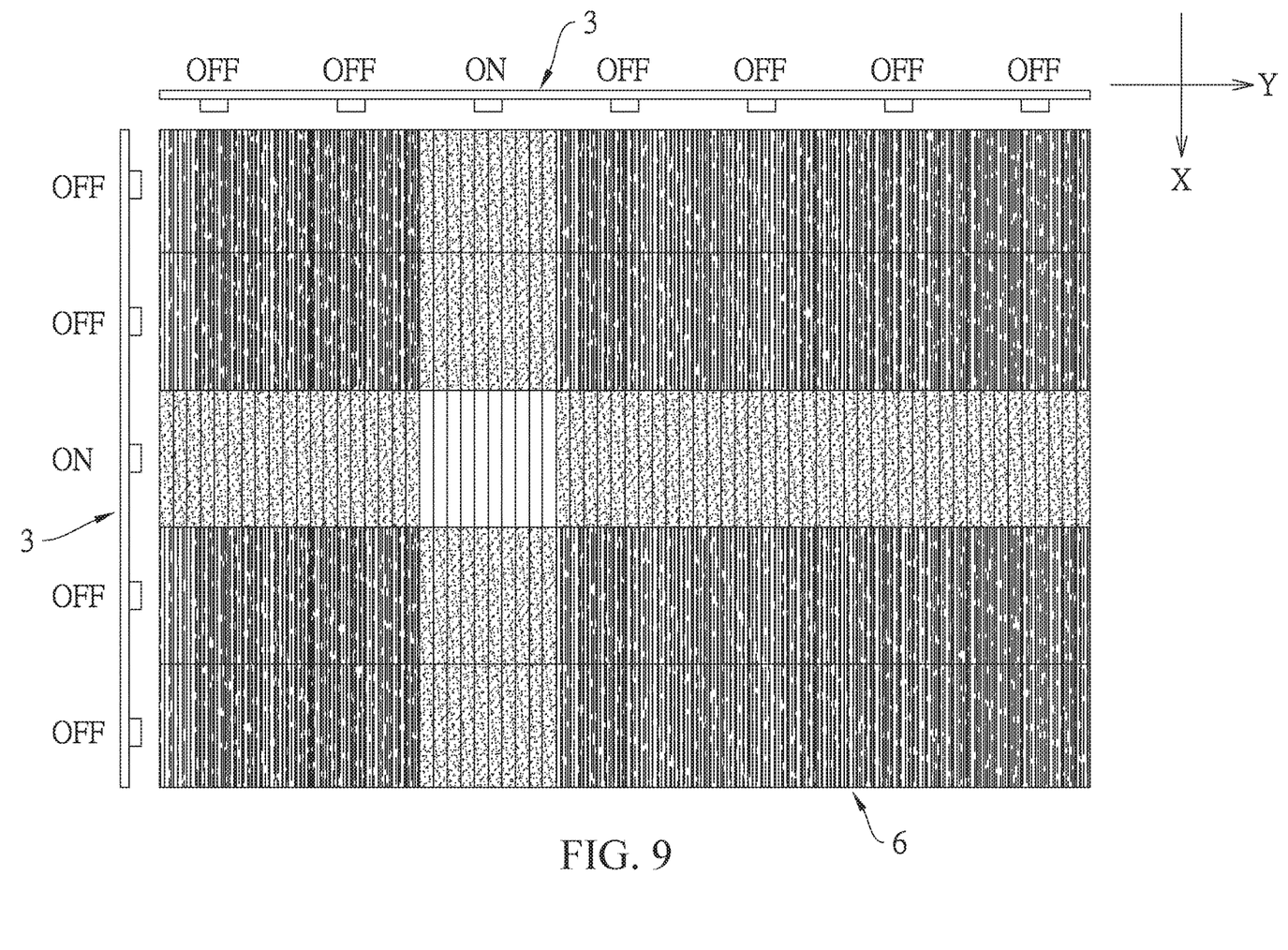
FIG. 9 is a schematic top view illustrating the local dimming effect in the second preferred embodiment.

In other words, the second preferred embodiment of the backlight module of the present invention still can be categorized into upper light-emitting units 3 and lower light-emitting units 3 from a sectional view in the thickness direction. However, from a top view, the light-emitting units 3 are set perpendicular to each other. The light-emitting units 3 disposed on the first carrying portion 215 emit light along the X axis, and the light emitting units 3 disposed on the second carrying portion 216 and the third carrying portion of 217 emit light along the Y axis. Meanwhile, in the embodiment, both of the first light guide plate 41 and the second light guide plate 51 may be made of plastic materials. By the design of the mutual perpendicular light-emitting units 3 and the emitting status of the light-emitting members 32 of the light-emitting units 3, the display panel 6 can offer the effect of local dimming as shown in FIG. 9, which can be applied to larger size display screens, such as monitors or TVs. Therefore, the images with high dynamic range can be obtained.

In conclusion, the backlight module and display device of the present invention provide the metal rear frame 21 with a specific bending portion, and the plurality of light-emitting units 3 directly contact the metal rear frame 21 and are alternately arranged. Therefore, it is not only to improve heat conduction and heat dissipation efficiency, but also to improve assembly efficiency and enhance the structure.

Although the present invention has been explained in relation to its preferred embodiments, it is to be understood that many other possible modifications and variations can be made without departing from the scope of the invention as hereinafter claimed.

What is claimed is:

1. A backlight module comprising:
    a frame unit, including a metal rear frame, wherein the metal rear frame has a first carrying portion, and a second carrying portion spaced from the first carrying portion, the first carrying portion and the second carrying portion are not at the same height;
    a plurality of light-emitting units, wherein one of the plurality of light-emitting units is disposed on the first carrying portion, and another one of the plurality of light-emitting units is disposed on the second carrying portion;
    a first optical unit, configured to receive the light generated from the light-emitting unit disposed on the first carrying portion; and
    a second optical unit, configured to receive the light generated from the light-emitting unit disposed on the second carrying portion;
    wherein the metal rear frame is provided with a body area, a first side edge area connected to one side of the body area, a second side edge area connected to another side of the body area and corresponding to the first side edge area, and two third side edge areas connected to the first side edge area and the second side edge area; and
    wherein the first side edge area and the second side edge area extend upward from the body area, the first side edge area and the second side edge area are higher than the body area, the first carrying portion is located in the body area, and the second carrying portion is located on the top of the first side edge area;
    wherein the body area is rectangular, the cross section of the first side edge area and the second side edge area are inverted U-shaped, and the two third side edge areas extend upward from the body area to form a plurality of sidewalls.

2. The backlight module as claimed in claim 1, wherein the first carrying portion is near the first side edge area or near one of the third side edge areas, and the first carrying portion is perpendicular to the second carrying portion.

3. The backlight module as claimed in claim 2, wherein the metal rear frame is further provided with a third carrying portion disposed on the second side edge area, the third carrying portion is located on the top of the second side edge area and is the same height as the second carrying portion, another one of the plurality of light-emitting units is located on the third carrying portion, and the second optical unit further receives the light generated from the light-emitting unit disposed on the third carrying portion.

4. The backlight module as claimed in claim 3, wherein the metal rear frame is further provided with a plurality of holes distributed on the second carrying portion, on the third carrying portion and on the junction of the two third side edge areas and the body.

5. The backlight module as claimed in claim 4, wherein the frame unit further includes a mold frame covering the first side edge area, the second side edge area, and the two third side edge areas of the metal rear frame, and the mold frame is filled in the plurality of holes.

6. The backlight module as claimed in claim 5, wherein the metal rear frame is further provided with at least one outlet located on the first side edge area or the second side edge area, and the plurality of holes near the outlet have higher distribution density than the plurality of holes away the outlet.

7. A backlight module comprising:
a backlight module as claimed in claim 1; and
a display panel disposed on the backlight module.

8. A backlight module comprising:
a frame unit, including a metal rear frame, wherein the metal rear frame has a first carrying portion, and a second carrying portion spaced from the first carrying portion, the first carrying portion and the second carrying portion are not at the same height;
a plurality of light-emitting units, wherein one of the plurality of light-emitting units is disposed on the first carrying portion, and another one of the plurality of light-emitting units is disposed on the second carrying portion;
a first optical unit, configured to receive the light generated from the light-emitting unit disposed on the first carrying portion; and
a second optical unit, configured to receive the light generated from the light-emitting unit disposed on the second carrying portion;
wherein the metal rear frame is provided with a body area, a first side edge area connected to one side of the body area, a second side edge area connected to another side of the body area and corresponding to the first side edge area, and two third side edge areas connected to the first side edge area and the second side edge area; and
wherein the first side edge area and the second side edge area extend upward from the body area and the first side edge area and the second side edge area are higher than the body area, the first carrying portion is located near the first side edge area, and the second carrying portion is located on the top of the first side edge area;
wherein the body area is rectangular, the cross section of the first side edge area and the second side edge area are inverted U-shaped, and the two third side edge areas extend upward from the body area to form a plurality of sidewalls.

9. The backlight module as claimed in claim 8, wherein the metal rear frame is further provided with a third carrying portion disposed on the second side edge area, the third carrying portion is located on the top of the second side edge area and is the same height as the second carrying portion, another one of the plurality of light-emitting units is located on the third carrying portion, and the second optical unit further receives the light generated from the light-emitting unit disposed on the third carrying portion.

10. The backlight module as claimed in claim 9, wherein the metal rear frame is further provided with a plurality of holes distributed on the second carrying portion, on the third carrying portion and on the junction of the two third side edge areas and the body.

11. The backlight module as claimed in claim 10, wherein the frame unit further includes a mold frame covering the first side edge area, the second side edge area, and the two third side edge areas of the metal rear frame, and the mold frame is filled in the plurality of holes.

12. The backlight module as claimed in claim 11, wherein the metal rear frame is further provided with at least one outlet located on the first side edge area or the second side edge area, and the plurality of holes near the outlet have higher distribution density than the plurality of holes away the outlet.

13. A backlight module comprising:
a backlight module as claimed in claim 8; and
a display panel disposed on the backlight module.

14. A backlight module comprising:
a frame unit, including a metal rear frame, wherein the metal rear frame has a first carrying portion, and a second carrying portion spaced from the first carrying portion, the first carrying portion and the second carrying portion are not at the same height;
a plurality of light-emitting units, wherein one of the plurality of light-emitting units is disposed on the first carrying portion, and another one of the plurality of light-emitting units is disposed on the second carrying portion;
a first optical unit, configured to receive the light generated from the light-emitting unit disposed on the first carrying portion; and
a second optical unit, configured to receive the light generated from the light-emitting unit disposed on the second carrying portion;
wherein the metal rear frame is provided with a body area, a first side edge area connected to the body area, a second side edge area, and two third side edge areas;
wherein the first side edge area is connected to one side of the body area, the second side edge area is connected to another side of the body area and corresponding to the first side edge area, each of the two third side edge areas is connected to the first side edge area and the second side edge area; and
wherein the first side edge area extends upward from the body area and is higher than the body area, the first carrying portion is located near one of the third side edge areas, the second carrying portion is located on the top of the first side edge area, and the first carrying portion is perpendicular to the second carrying portion.

15. The backlight module as claimed in claim 14, wherein the body area is rectangular, the second side edge area extends upward from the body area and is higher than the body area, the cross section of the first side edge area and the second side edge area are inverted U-shaped, and the two third side edge areas extend upward from the body area to form a plurality of sidewalls.

16. The backlight module as claimed in claim 15, wherein the metal rear frame is further provided with a third carrying portion disposed on the second side edge area, the third carrying portion is located on the top of the second side edge area and is the same height as the second carrying portion, another one of the plurality of light-emitting units is located on the third carrying portion, and the second optical unit further receives the light generated from the light-emitting unit disposed on the third carrying portion.

17. The backlight module as claimed in claim 16, wherein the metal rear frame is further provided with a plurality of holes distributed on the second carrying portion, on the third carrying portion and on the junction of the two third side edge areas and the body.

18. The backlight module as claimed in claim 17, wherein the frame unit further includes a mold frame covering the first side edge area, the second side edge area, and the two third side edge areas of the metal rear frame, and the mold frame is filled in the plurality of holes.

19. The backlight module as claimed in claim 18, wherein the metal rear frame is further provided with at least one outlet located on the first side edge area or the second side edge area, and the plurality of holes near the outlet have higher distribution density than the plurality of holes away the outlet.

20. A backlight module comprising:
a backlight module as claimed in claim 14; and
a display panel disposed on the backlight module.

* * * * *